(12) United States Patent
Norita et al.

(10) Patent No.: US 6,252,659 B1
(45) Date of Patent: Jun. 26, 2001

(54) THREE DIMENSIONAL MEASUREMENT APPARATUS

(75) Inventors: Toshio Norita, Osaka; Hiroshi Uchino, Otokuni-Gun; Hideki Tanabe, Ibaraki; Eiiehi Ide, Itami; Koichi Kamon, Takatsuki, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/273,543

(22) Filed: Mar. 22, 1999

Related U.S. Application Data
(60) Provisional application No. 60/100,884, filed on Sep. 23, 1998.

(30) Foreign Application Priority Data

Mar. 26, 1998 (JP) .................................................. 10-079431

(51) Int. Cl.[7] .................................................. G01B 11/24
(52) U.S. Cl. .................................................. 356/376
(58) Field of Search .................................................. 356/376, 375; 382/162, 157; 348/139, 195, 197; 250/559.22, 559.19

(56) References Cited

U.S. PATENT DOCUMENTS

| | | | |
|---|---|---|---|
| 4,072,405 | * | 2/1978 | Ozeki . |
| 5,129,010 | * | 7/1992 | Higuchi et al. ...................... 356/376 |
| 5,177,556 | * | 1/1993 | Rioux ................................... 356/376 |
| 5,608,529 | * | 3/1997 | Hori ..................................... 356/376 |
| 5,668,631 | | 9/1997 | Norita et al. . |
| 6,141,105 | * | 10/2000 | Yahashi et al. ..................... 356/376 |

FOREIGN PATENT DOCUMENTS

| | | |
|---|---|---|
| 7-174536 | 7/1995 | (JP) . |
| 09145319A | 6/1997 | (JP) . |

* cited by examiner

*Primary Examiner*—Hoa Q. Pham
(74) *Attorney, Agent, or Firm*—Burns, Doane, Swecker & Mathis, LLP

(57) ABSTRACT

A three-dimensional measurement apparatus includes an optical system for scanning a reference beam across a target object to be measured, a light sensor which receives light reflected from the target object, and a processor for calculating a three-dimensional shape of the target object from the received light. An image for calculating the three-dimensional shape of the target object and an image for displaying the target object are both captured by the same sensor. The displayed image is a grayscale image that is based on a centroid that is calculated from multiple data samples taken for each pixel in the image as the target is being scanned.

21 Claims, 17 Drawing Sheets

THREE DIMENSIONAL MEASUREMENT APPARATUS

This disclosure is based upon, and claims priority from, provisional U.S. patent application No. 60/100,884, filed Sep. 23, 1998, and Japanese Application No. 10-079431, filed Mar. 26, 1998, the contents of which are incorporated herein by reference.

FIELD OF THE INVENTION

The present invention relates to a three-dimensional measurement apparatus, and more particularly to a so-called active type three-dimensional measurement apparatus that captures three-dimensional data by projecting a reference beam on a target object and receiving its reflected light.

BACKGROUND OF THE INVENTION

In the prior art, so-called active type three-dimensional measurement apparatuses have been known that capture three-dimensional data by projecting a reference beam on a target object and receiving its reflected light. Among these types of devices, an apparatus that can generate both a range image (the image used to measure distance and to calculate the three-dimensional shape of the target object) and a color image (the image used to display the target object) is known, as disclosed for example, in Japanese Patent Unexamined Publication No. 9-145319.

FIG. 19 is a block diagram showing the configuration of such an active type three-dimensional measurement apparatus. Referring to the figure, a beam splitter (beam-splitting prism) 52 is constructed with a color separation film (dichroic mirror) 521, two prisms 522 and 523 sandwiching the color separation film 521, a range image capturing CCD sensor 53 provided on the emergent face of the prism 522, and a color image capturing CCD sensor 54 provided on the emergent surface of the prism 523.

A target object is scanned by a reference beam emitted from a semiconductor laser, and the light reflected by the target object enters a light receiving lens 51a. The light that enters the light receiving lens 5 la passes through the prism 522 and reaches the color separation film 521. Light U0 lying in the oscillation wavelength region of the semiconductor laser is reflected by the color separation film 521 and directed toward the range image capturing CCD sensor 53. On the other hand, light C0 transmitted through the color separation film 521 passes through the prism 523 and enters the color image capturing CCD sensor 54.

The range image capturing CCD sensor 53 is driven by a range image capturing CCD driver 204. The color image capturing CCD sensor 54 is driven by a color image capturing CCD driver 203. The output of the range image capturing CCD sensor 53 is processed by an A/D converter (an output processing circuit) 202, and then stored in a range image frame memory 206. The output of the color image capturing CCD sensor 54 is processed by an A/D converter (an output processing circuit) 201, and then stored in a color image frame memory 205.

The prior art active type three-dimensional measurement apparatus described above has exhibited the following limitations, due to the use of the two CCD sensors 53 and 54.

(1) The mounting positions of the two CCD sensors must be adjusted very precisely so as to eliminate misregistration between the range image and the color image.

(2) Since near infrared light is primarily used for the reference beam, it is necessary to produce a prism that can separate incident light into near infrared light for the range image and visible light for the color image.

(3) The quality of the color image is dependent on the spectral characteristics of the prism that is used.

The present invention has been devised to address the above-listed limitations, and one object of the invention is to solve the problems associated with the use of two sensors in a three-dimensional measurement apparatus.

SUMMARY OF THE INVENTION

To achieve the above object, according to one aspect of the present invention, a three-dimensional measurement apparatus comprises projecting means for projecting a reference beam toward a target object to be measured, light receiving means for receiving light reflected from the target object, and calculating means for calculating a three-dimensional shape of the target object from the received reflected light. In this apparatus, an image for calculating the three-dimensional shape of the target object and an image for displaying the target object are captured by the same sensor.

According to the present invention, since the image for calculating the three-dimensional shape of the target object and the image for displaying the target object are both captured by the same sensor, there is no need to adjust the mounting positions of two sensors, which was the case with the prior art. Furthermore, there is no need to produce a prism capable of separating incident light into near infrared light and visible light, and therefore, the quality of the color image can be improved.

DETAILED DESCRIPTION

Figure 1:
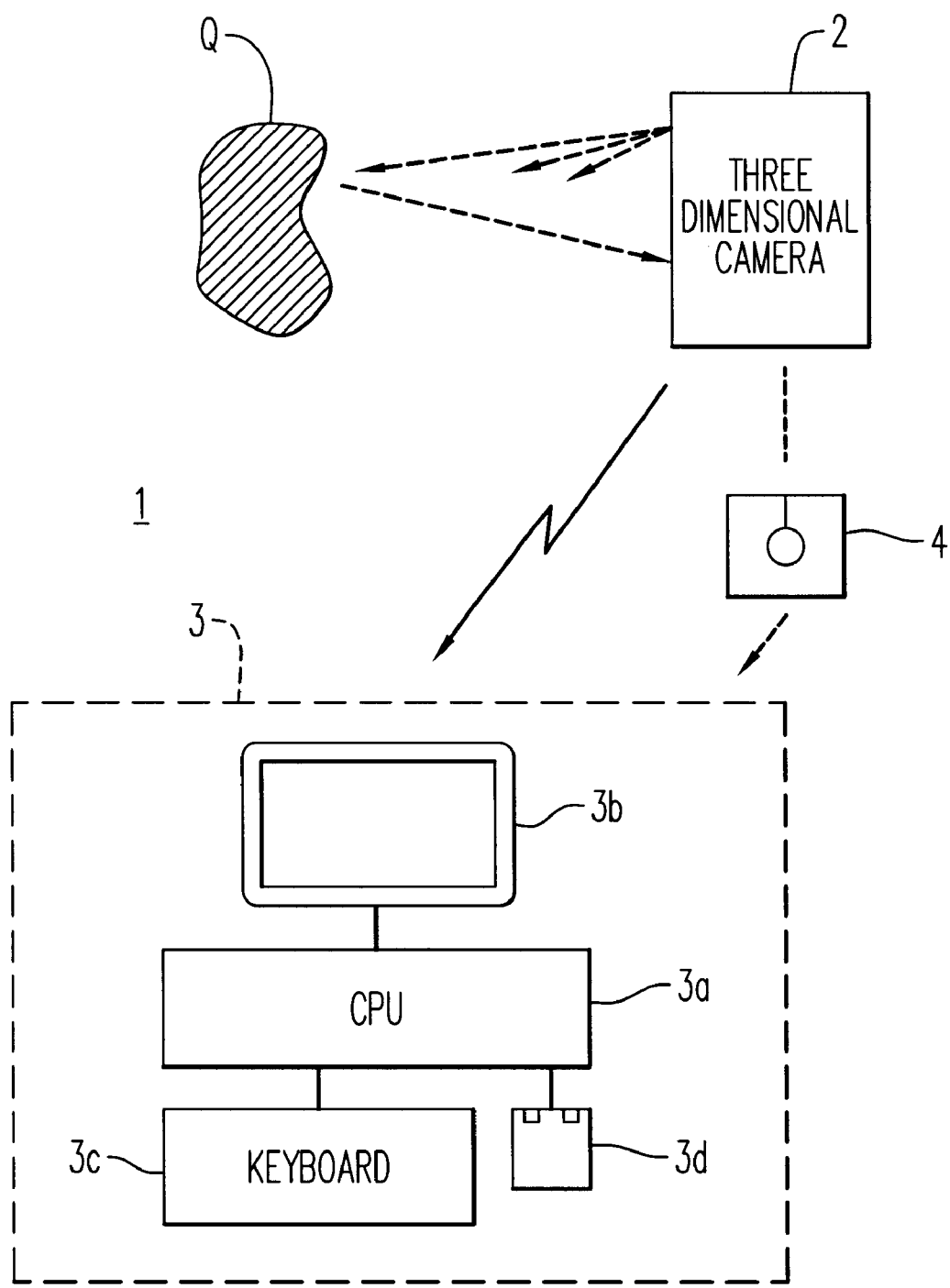
FIG. 1 is a diagram showing the configuration of a measurement system according to a first embodiment of the present invention.

FIG. 1 is a diagram showing the configuration of a measurement system 1 according to a first embodiment of the present invention. Referring to the figure, the measurement system 1 comprises a three-dimensional camera (range finder) 2 which makes stereoscopic measurements using a slit ray projection method, and a host system 3 which processes output data from the three-dimensional camera 2.

The three-dimensional camera 2 outputs a two-dimensional image describing color information of an object Q and data necessary for calibration, together with measurement data (slit image data) identifying the three-dimensional positions of a plurality of sampling points on the object Q. The host 3 performs calculations to obtain the coordinates of the sampling points using a triangulation method.

The host 3 is a computer system comprising a CPU 3a, a display 3b, a keyboard 3c, a mouse 3d, etc. The CPU 3a incorporates software for processing the measurement data. Both on-line data transfer and off-line data transfer, using a removable recording medium 4, are possible as a method of data transfer between the host 3 and the three-dimensional camera 2. Examples of the recording medium 4 include magneto-optical disks (MOs), mini-disks (MDs), and memory cards.

Figure 2A:
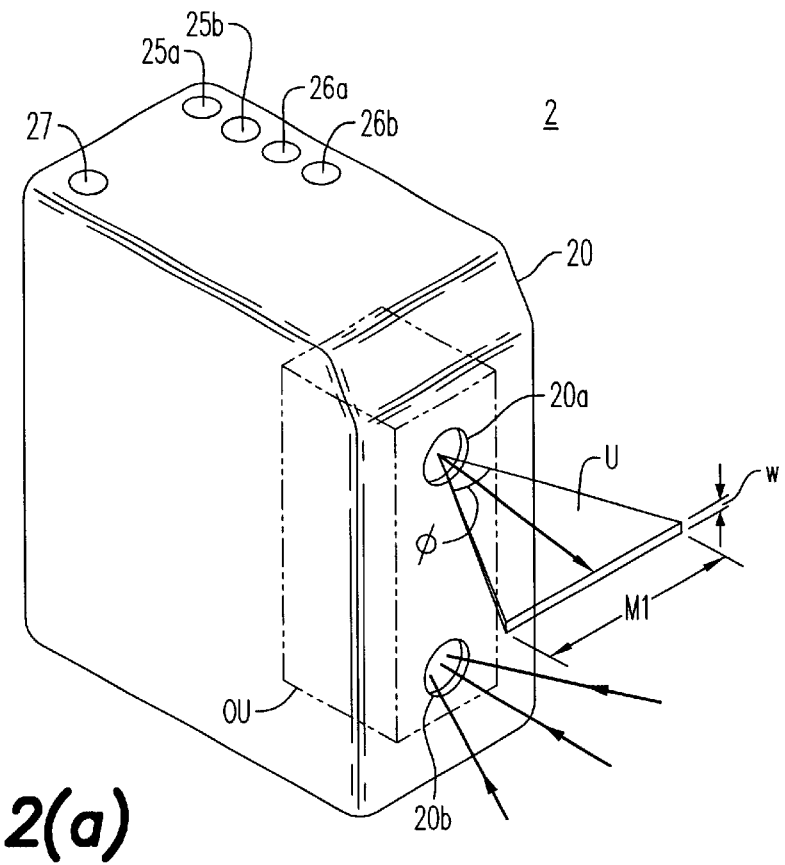
FIGS. 2a and 2b are diagrams showing an external view of a three-dimensional camera.
Figure 2B:
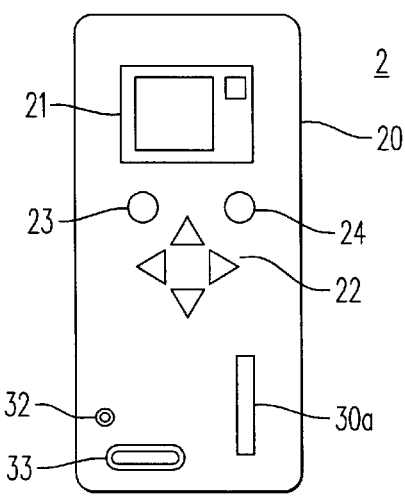

FIGS. 2a and 2b are diagrams showing an external view of the three-dimensional camera 2. A projection window 20a and a light receiving window 20b are provided in the front panel of a housing 20. The projection window 20a is located upward of the light receiving window 20b. A slit ray U (a strip of laser beam with a prescribed width of w) emitted from an internal optical unit OU passes through the projection window 20a and is directed toward an object to be measured (the subject or the target object). The radiating angle φ along the lengthwise direction M1 of the slit ray U is fixed. Part of the slit ray U reflected from the surface of the object passes through the light receiving window 20b and enters the optical unit OU. The optical unit OU is equipped with a two-axis adjusting mechanism for optimizing the relative relationship between the projection axis and the light receiving axis.

On the top panel of the housing 20 are provided zooming buttons 25a and 25b, manual focusing buttons 26a and 26b, and a shutter button 27. As shown in FIG. 2(b), a liquid crystal display 21, cursor buttons 22, a select button 23, a cancel button 24, an analog output terminal 32, a digital output terminal 33, and an insertion slot 30a for the recording medium 4 are provided on the rear panel of the housing 20.

The liquid crystal display (LCD) 21 is used as an electronic viewfinder as well as an operation screen display means. The camera operator can set up the shooting mode by using the buttons 22 to 24 on the rear panel. Measurement data is output from the digital output terminal 33, and a two-dimensional image signal is output, for example in the NTSC format, from the analog output terminal 32. The digital output terminal 33 is, for example, a SCSI terminal.

Figure 3:
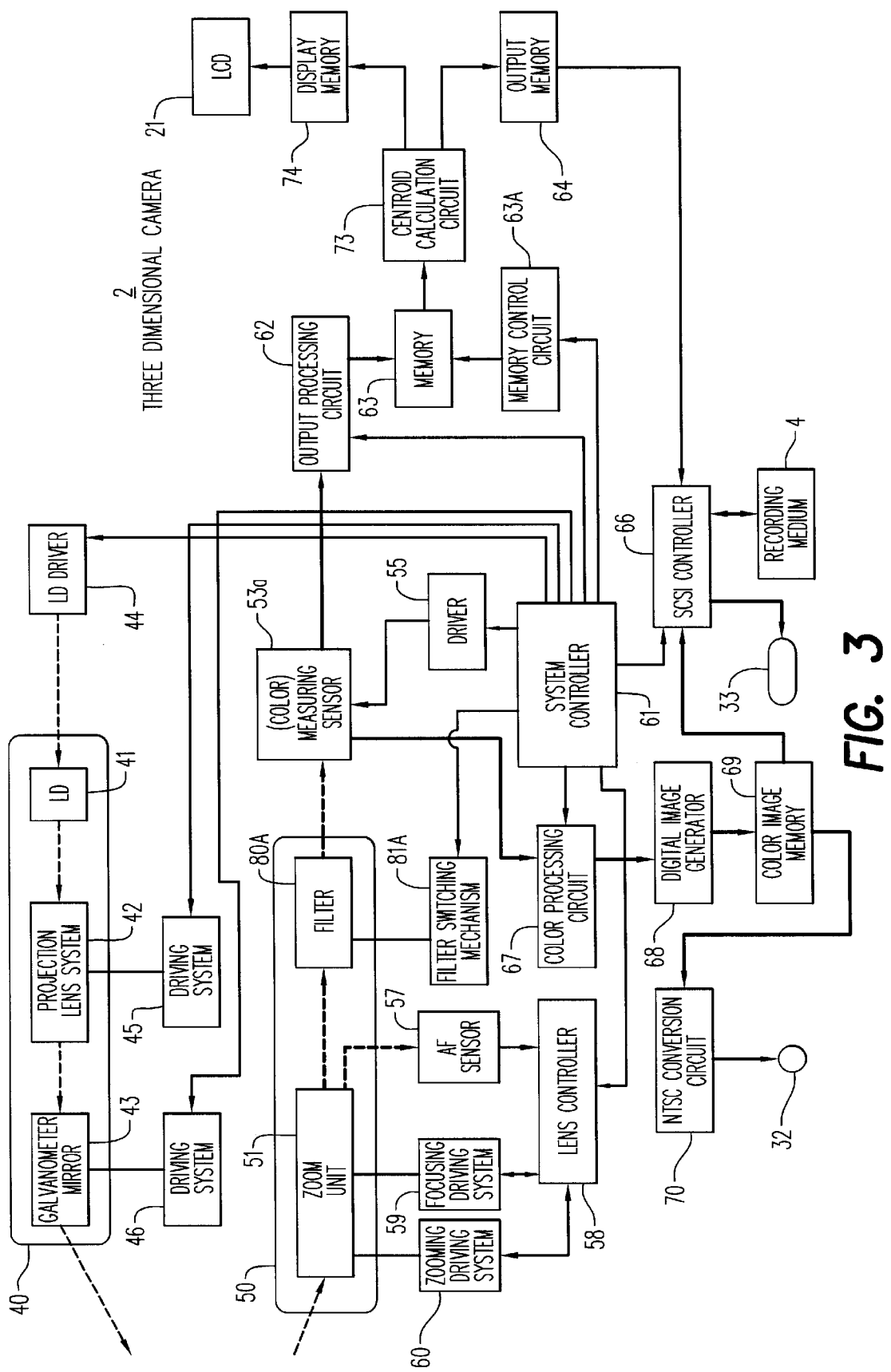
FIG. 3 is a block diagram showing the functional configuration of the three-dimensional camera.

FIG. 3 is a block diagram showing the functional configuration of the three-dimensional camera 2. In the figure, solid-line arrows indicate electrical signal flows, and dotted-line arrows show light paths.

The three-dimensional camera includes two optical systems 40 and 50, one for projection and the other for light reception, which together constitute the optical unit OU. In the optical system 40, a laser beam with a wavelength of 670 nm emitted from a semiconductor laser (LD) 41 passes through a projection lens system 42 to form the slit ray U which is deflected by a galvanometer mirror (scanning means) 43. A driver 44 for the semiconductor laser 41, a driving system 45 for the projection lens system 42, and a driving system 46 for the galvanometer mirror 43 are controlled by a system controller 61.

In the optical system 50, incident light converged by a zoom unit 51 enters a filter 80A. The detail of the filter 80A will be described later. The incident light passes through the filter 80A and enters a color measuring sensor (CCD) 53a. The zoom unit 51 is of the internal focusing type, and a portion of the incident light is used for auto focusing (AF). The AF function is implemented using an AF sensor 57, a lens controller 58, and a focusing driving system 59. A zooming driving system 60 is provided for motor-driven zooming.

Imaging information captured by the color measuring sensor 53a is transferred to a memory 63 or a color processing circuit 67 in synchronism with a clock signal from a driver 55. The imaging information subjected to color processing in the color processing circuit 67 is quantized in a digital image generator 68 and stored in a color image memory 69. After that, the color image data is transferred from the color image memory 69 to a SCSI controller 66, and is output online via the digital output terminal 33 or stored on the recording medium 4 in association with the measurement data. The imaging information stored in the memory 69 is also output online via an NTSC conversion circuit 70 and the analog output terminal 32. In an alternate embodiment (not shown), analog imaging information produced by the color processing circuit can be directly supplied to the NTSC conversion circuit 70, bypassing the digital image generator 69.

The color image is an image with the same angle of view as the range image captured by the color measuring sensor 53a, and is used as reference information during application processing at the host 3. Processing that utilizes the color information includes, for example, processing for generating a three-dimensional geometric model by combining multiple sets of measurement data having different camera focuses, processing for decimating unnecessary vertexes of the three-dimensional geometric model, etc. The system controller 61 issues instructions to a character generator (not shown), to display proper characters and symbols on the screen of the LCD 21.

An output processing circuit 62 includes an amplifier for amplifying an optical-to-electrical converted signal representing each pixel g which is output from the color measuring sensor 53a, and an A/D converter for converting the optical-to-electrical signal to 8-bit incident light data. The memory 63 is a read-write memory, and stores the incident light data output from the output processing circuit 62. In the illustrated embodiment, if each pixel of an image is represented by one byte of data, the memory 63 has a storage capacity of 200×32×33 bytes, for reasons which will become apparent. A memory control circuit 63A specifies addresses for reading and writing the memory 63.

A centroid calculation circuit 73, based on the incident light data stored in the memory 63, generates a grayscale image corresponding to the shape of the target object and supplies the image to a display memory 74, and also calculates data for calculating three-dimensional positions and supplies the data to an output memory 64. The grayscale image stored in the display memory 74, and the color image stored in the color image memory 69, are displayed on the screen of the LCD 21.

The NTSC conversion circuit 70 includes a video D/A (analog image generating circuit). The filter 80A is switched by a filter switching mechanism 81A.

Figure 4:
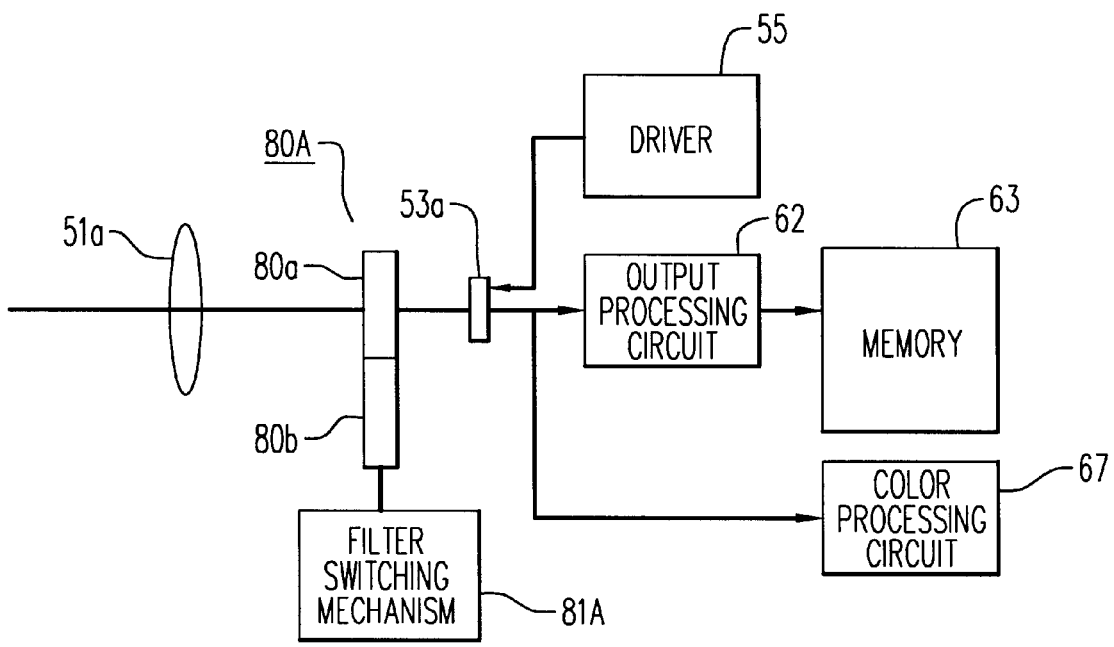
FIG. 4 is a diagram showing the configuration of a filter, a filter switching mechanism, and their peripheral circuitry according to the first embodiment.

FIG. 4 is a diagram showing the details of the filter 80A, the filter switching mechanism 81A, and their peripheral circuitry. Referring to the figure, the filter 80A contains an IR (infrared) cutoff filter 80a and a band pass filter 80b. The filter switching mechanism 81A switches the filter 80A so that the light introduced through the light receiving lens 51a in the zoom unit 51 is input to the color measuring sensor 53a either through the IR cutoff filter 80a or through the band pass filter 80b. More specifically, when capturing the range image, the band pass filter 80b, whose pass band corresponds to the wavelength of the reference beam, is positioned in the optical path between the lens 51a and the sensor 53a, and when capturing the color image, the IR cutoff filter 80a is used. The color measuring sensor 53a is driven by the driver 55. The range image is latched into the memory 63 after being processed by the output processing circuit, as previously described. The color image data is supplied to the color processing circuit 67.

In this way, in the measurement system of the present embodiment, the range image and the color image are displaced in time so that both images can be captured using the same measuring sensor 53a. When there is little or no motion in the target object, this displacement in time does not present a particular problem in performing the measurements.

Depending on the light receiving lens 51a that is used and the wavelength of the reference beam, there may arise a displacement between the focal point of the visible light and the focal point of the reference beam. If this happens, adjustments can be made by varying the thicknesses of the filters 80a and 80b so that the focal points coincide with each other.

A sensor having at least one channel which has a light sensitivity in the wavelength region of the reference beam is used as the color measuring sensor (CCD) 53a. When a particular channel of the color measuring sensor 53a has a light sensitivity in the wavelength region of the reference beam, only that particular channel is used for capturing the range image. For example, only the R (red) channel might be used for capturing the range image. When all the channels of the color measuring sensor 53a have a light sensitivity in the wavelength region of the reference beam (provided that the degree of sensitivity does not affect the measurements), all the channels (R, G (green), and B (blue)) are used for capturing the range image.

The filter 80A can be placed anywhere upstream of the color measuring sensor 53a. It is, however, desirable that the filter 80A be placed between the light receiving lens 51a and the color measuring sensor 53a. By so doing, the areas of the filters 80a and 80b can be reduced, thereby decreasing the burden of the filter switching mechanism 81A.

The present embodiment has been described with a color CCD of an (R, G, B) configuration as an example, but it will be appreciated that a color CCD of a (G, Cy, Ye, Mg) configuration may be used as the color measuring sensor 53a.

When the arrangement of the present embodiment is employed, there is no need to adjust the mounting positions of two sensors, which was the case with the prior art, since the range image and the color image are both read using the same sensor. Furthermore, there is no need to produce a prism capable of separating the incident light into near infrared light and visible light, and thus the quality of the color image can be improved. Moreover, since only one sensor is used, it becomes possible to reduce the peripheral circuitry compared with the prior art.

Figure 5:
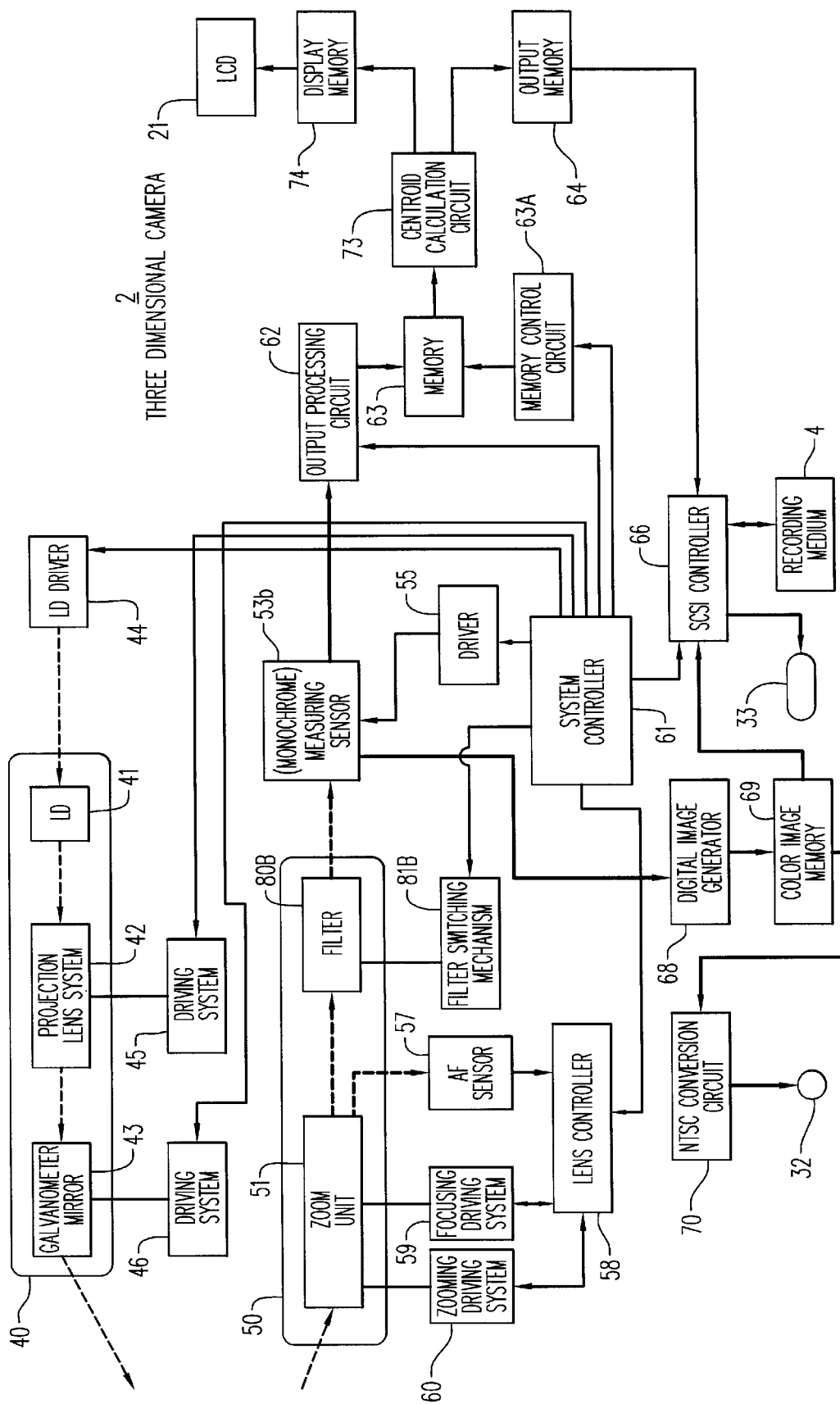
FIG. 5 is a block diagram of a three-dimensional camera according to a second embodiment of the present invention.

FIG. 5 is a diagram showing the configuration of a three-dimensional camera according to a second embodiment of the present invention. The three-dimensional camera of the second embodiment differs from the first embodiment in the following points. In the second embodiment, the filter 80A (see FIG. 3) of the first embodiment is replaced by a filter 80B. Further, the filter switching mechanism 81A is replaced by a filter switching mechanism 81B. Also, the color measuring sensor 53a is replaced by a monochrome measuring sensor (monochrome CCD) 53b. In the second embodiment, the output of the monochrome measuring sensor 53b is input directly to the digital image generator 68. That is, the color processing circuit 67 is not provided in the second embodiment.

Figure 6:
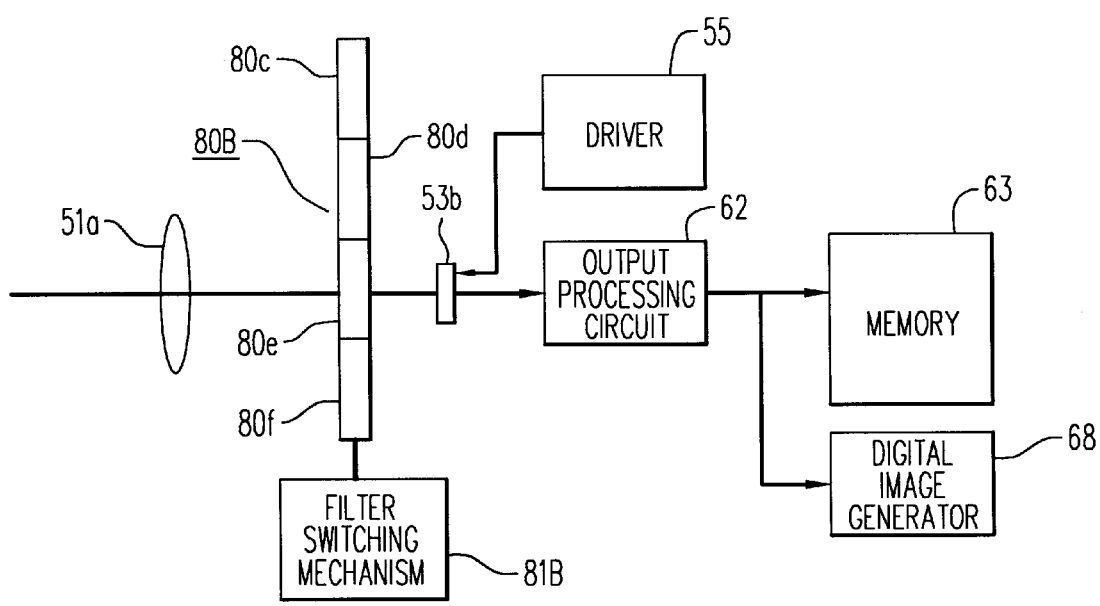
FIG. 6 is a diagram showing the configuration of a filter, a filter switching mechanism, and their peripheral circuitry according to the second embodiment.

FIG. 6 is a diagram showing the configuration of the filter 80B, the monochrome measuring sensor 53b, and their peripheral circuitry. The filter 80B contains a blue filter 80c, a green filter 80d, a red filter 80e, and a band pass filter 80f. The blue filter 80c, the green filter 80d, and the red filter 80e are filters for the color image. The filter switching mechanism 81B performs control by switching between the respective filters so that the reflected light introduced through the light receiving lens 51a impinges upon the monochrome measuring sensor 53b after passing through the appropriate filter. The monochrome measuring sensor 53b is driven by the driver 55, and the output of the monochrome measuring sensor 53b is supplied to the memory 63 via the output processing circuit 62 or to the digital image generator 68.

In the present embodiment, the filter switching mechanism 81B performs filter switching so that when capturing the range image, for example, the band pass filter, whose pass band corresponds to the wavelength of the reference beam, is used. On the other hand, when capturing the color image, the R, G, and B filters 80c to 80e are used in sequence to capture three images corresponding to the respective colors.

In the present embodiment, since a monochrome measuring sensor 53b can be used, the number of driver circuits and processing circuits associated with the sensor can be reduced in comparison with the first embodiment, thus serving to reduce the apparatus cost.

The above embodiment has been described using R, G, B color separation filters, but instead, C, M, Y color separation filters may be used. Further, if a col or image is to be reproduced, other color configurations may be used.

Figure 7:
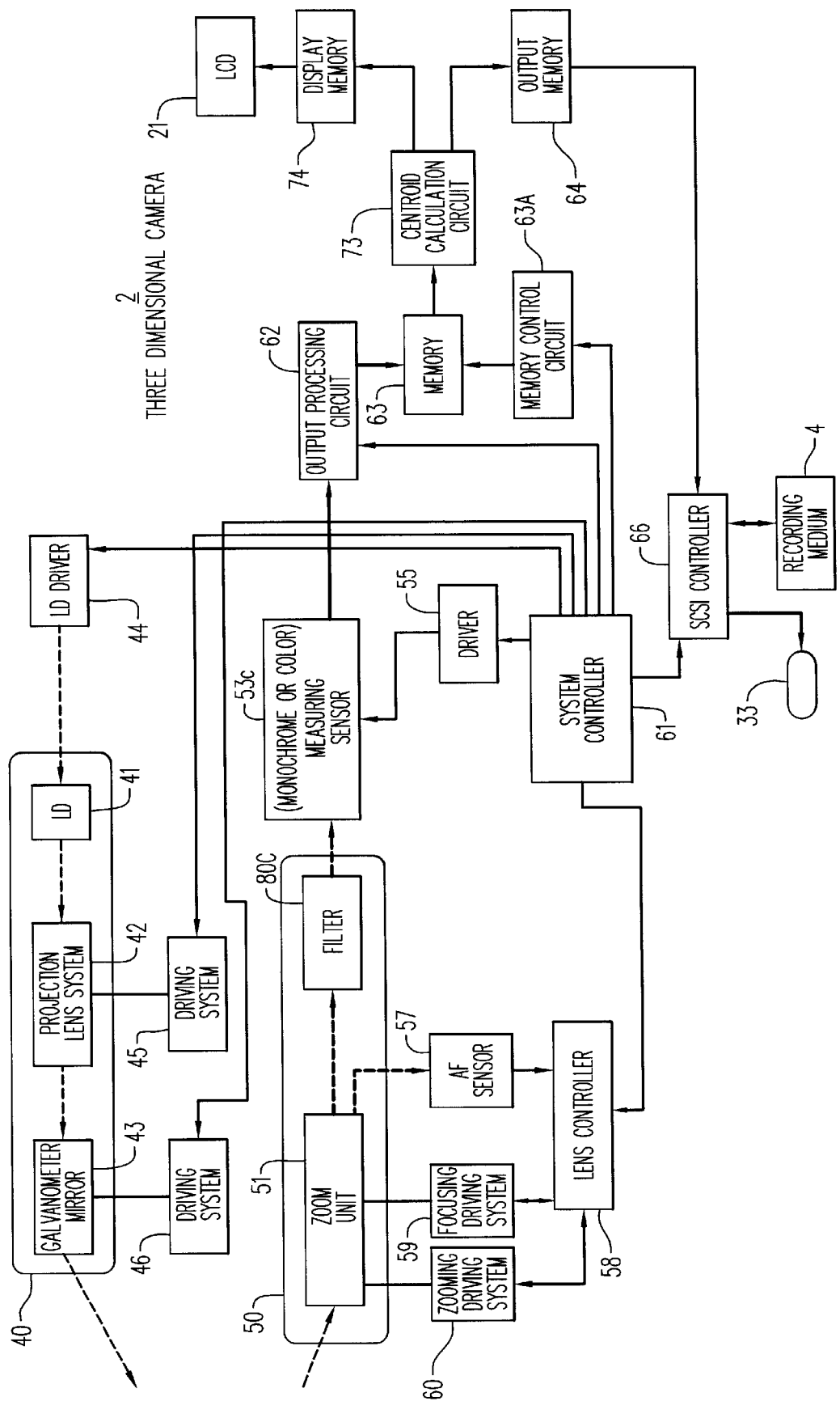
FIG. 7 is a block diagram showing the configuration of a three-dimensional camera according to a third embodiment of the present invention.

FIG. 7 is a diagram showing the configuration of a three-dimensional camera according to a third embodiment of the present invention. The three-dimensional camera of the present embodiment differs from the first embodiment in the following points. A color image is not displayed on the three-dimensional camera of the present embodiment. Only a monochrome luminance image is displayed on the LCD 21. In the present embodiment, a filter 80C and a monochrome measuring sensor 53c (or a color measuring sensor) are used in place of the filter 80A and color measuring sensor 53a shown in FIG. 3. The filter switching mechanism 81A, color processing circuit 67, digital image generator 68, color image memory 69, NTSC converter 70, and analog output terminal 32 shown in FIG. 3 are not used in the present embodiment.

Figure 8:
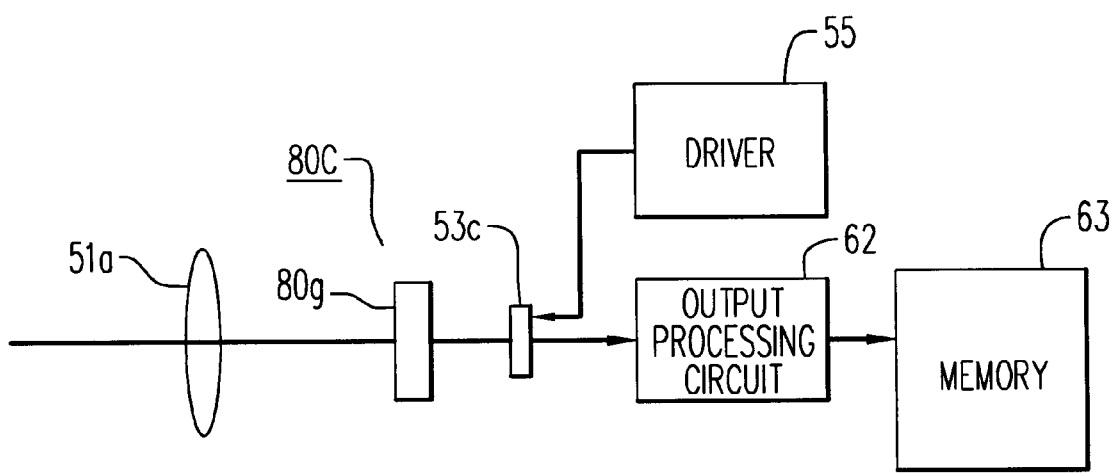
FIG. 8 is a diagram showing the configuration of a filter and its peripheral circuitry according to the third embodiment.

FIG. 8 is a diagram illustrating the configuration of the filter 80C, the monochrome measuring sensor 53c, and their peripheral circuitry. The filter 80C consists only of a band pass filter 80g. The reflected light from the target object, introduced through the light receiving lens 51a, enters the monochrome measuring sensor 53c via the band pass filter 80g. The monochrome measuring sensor 53c is driven by the driver 55. The output of the monochrome measuring sensor 53c is supplied to the memory 63 via the output processing circuit 62.

The monochrome measuring sensor 53c, a CCD area sensor, has an integrating region and an accumulating region; when integrating operations in the integrating region are completed, charges are transferred at once to the accumulating region from which the charges are sequentially output to external circuitry. In the present embodiment, image data captured by the monochrome measuring sensor 53c is used to produce the range image and the display image. That is, in the present embodiment also, the range image and the display image are input using a single sensor.

Data used for the calculation of the centroid, i.e., Sxi, is used as the monochrome luminance image for display. A method of obtaining Sxi and the reason that it can be used as the monochrome luminance image for display will be described.

Figure 9A:
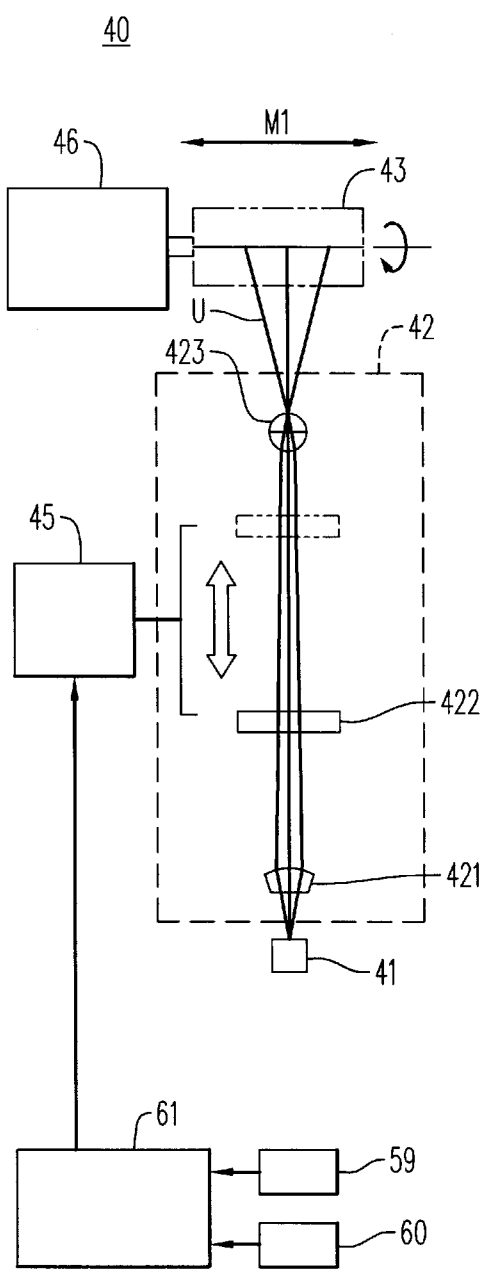
FIGS. 9a and 9b are schematic diagrams showing the construction of a projection lens system.
Figure 9B:
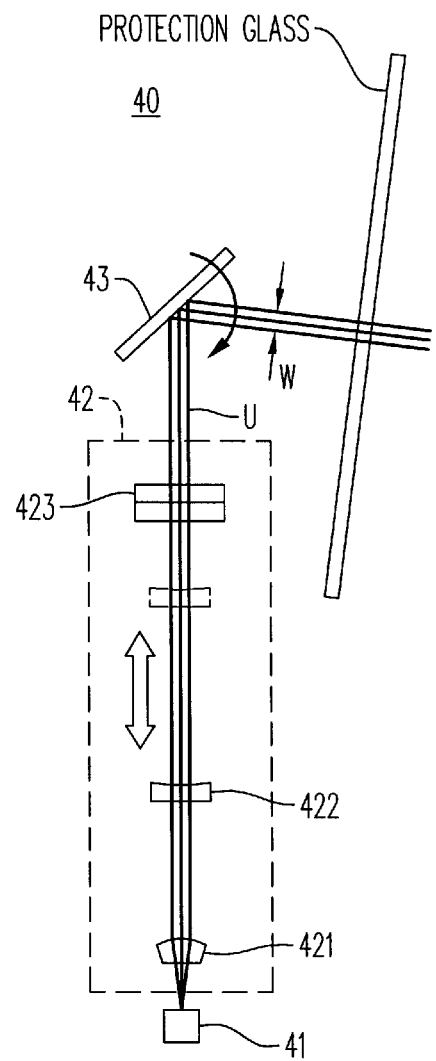

FIGS. 9a and 9b are schematic diagrams showing the construction of the projection lens system 42. FIG. 9a is a front view, and FIG. 9b is a side view. The projection lens system 42 consists of three lenses, that is, a collimator lens 421, a variator lens 422, and an expander lens 423. Optical processing is performed in the following sequence on the laser beam emitted from the semiconductor laser 41 to obtain a suitable slit ray U. First, the beam is collimated by the collimator lens 421. Next, the beam diameter of the laser beam is adjusted by the variator lens 422. Finally, the beam is expanded along the slit length direction M1 by the expander lens 423.

The variator lens 422 is provided so that the slit ray U of width corresponding to three or more pixels is projected on the measuring sensor 53c regardless of the object distance and the angle of view. Under direction of the system controller 61, the driving system 45 moves the variator lens 422 in such a manner as to maintain the width, w, of the slit ray U constant on the measuring sensor 53c. The zoo m unit 51 at the light receiving side moves in interlocking fashion with the variator lens 422.

When the slit length is expanded prior to deflection by the galvanometer mirror 43, distortion of the slit ray U can be reduced more effectively than when the expansion is done after the deflection. Further, the galvanometer mirror 43 can be reduced in size by disposing the expander lens 423 in the final stage of the projection lens system 42, that is, at a position closer to the galvanometer mirror 43.

Figure 10A:
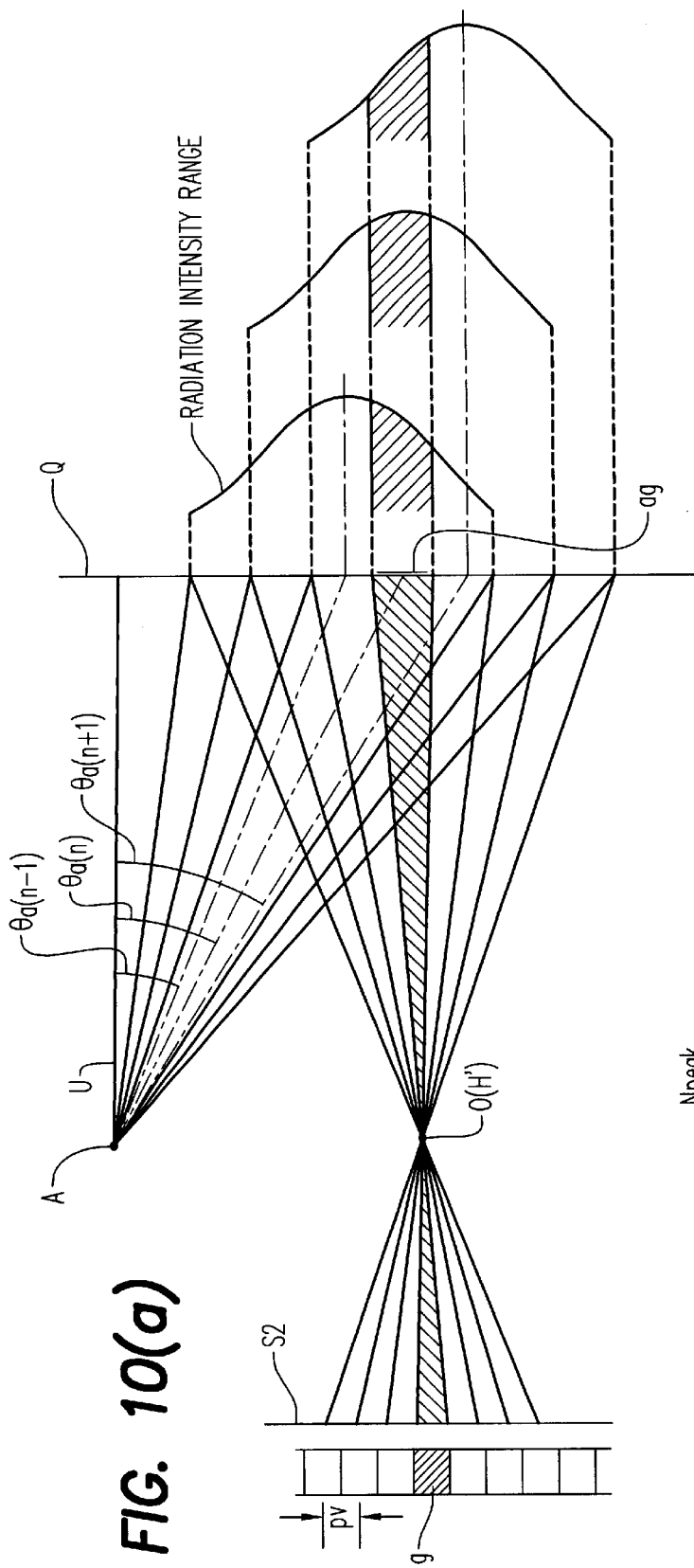
FIGS. 10a and 10b are diagrams illustrating the principle of three-dimensional position calculations in the measurement system.
Figure 10B:
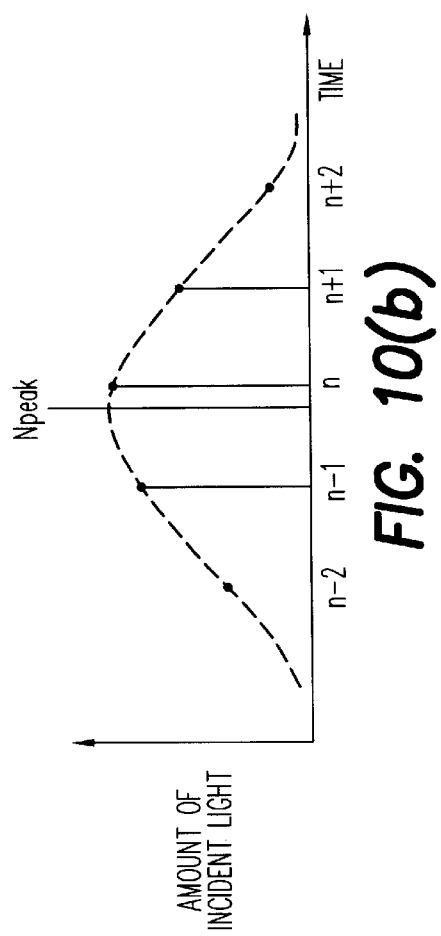

FIGS. 10a and 10b are diagrams illustrating the principle of three-dimensional position calculations in the measurement system 1. In the diagrams, only five samplings of the amount of incident light are shown to facilitate an understanding.

A slit ray U which is wide enough to cover a plurality of pixels on an imaging surface S2 of the measuring sensor 53c, is directed to the object Q. More specifically, the width of the slit ray U is set equal to that of five pixels. The slit ra y U is deflected from the top toward the bottom in FIG. 10 so that it moves on the imaging surface S2 by one pixel pitch pv in each sampling cycle, and the object Q is thus scanned. At the end of each sampling cycle, incident light data (optical-to-electrical converted information) for one frame is output from the monochrome measuring sensor 53c. In practice, the deflection is performed at constant angular velocity.

When attention is paid to one particular pixel g on the imaging surface S2, in the present embodiment the incident light data is obtained 32 times by the 32 samplings taken during the scanning. The timing (temporal centroid Npeak or centroid ip) at which the optical axis of the slit ray U passes the object surface region ag opposing the given pixel g, is obtained by calculating the centroid of the incident light data obtained 32 times.

When the surface of the object Q is flat, and there is no noise attributable to the characteristics of the optical system, the amount of incident light on the given pixel g increases at the time when the slit ray passes, as shown in FIG. 10b, and its distribution usually resembles a Gaussian distribution. When the amount of incident light is maximum at a time intermediate the n-th sampling and the immediately preceding (n−1)th sampling, as shown in the figure, that time substantially coincides with the temporal centroid Npeak.

The position (coordinates) of the object Q is calculated by means of well-known triangulation principles, based on the relationship between the intensity of the slit ray radiation and the direction of the incident slit ray on the given pixel at the above-obtained temporal centroid. This achieves a measurement with a resolution higher than the resolution defined by the pixel pitch pv on the imaging surface.

The amount of incident light on the given pixel g depends on the reflectance of the object Q. However, the relative ratio between each sampled incident light amount is constant regardless of the absolute amount of incident light. That is, the lightness or darkness of the object color does not affect the accuracy of the centroid peak determination, and hence the depth measurement.

Figure 11:
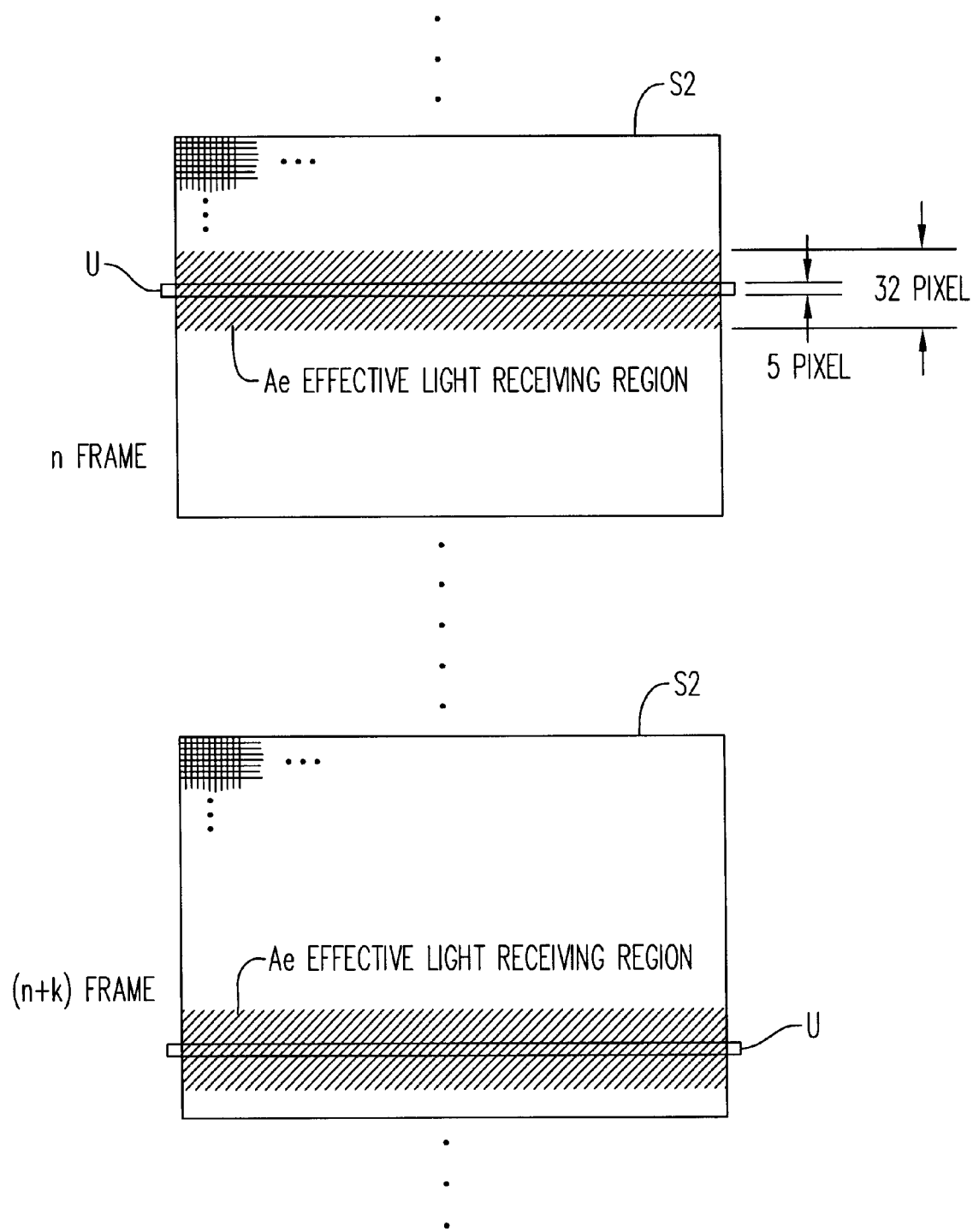
FIG. 11 is a diagram showing a sensor readout range.

FIG. 11 is a diagram showing the measurement region of the monochrome measuring sensor 53c. As shown in FIG. 11, the readout of one frame from the monochrome measuring sensor 53c is done, not using the entire imaging surface S2, but using only the effective light receiving region (a zonal image) Ae, which comprises a portion of the imaging surface S2, to achieve high speed reading. The effective light receiving region Ae is the region of the imaging surface S2 that corresponds to the measurable distance range of the object Q at a particular radiation timing of the slit ray U, and shifts by one pixel for each frame as the slit ray U is deflected. In the present embodiment, the number of pixels in the shift direction of the effective light receiving region Ae is fixed at 32. The method of reading only a portion of the image captured by a CCD area sensor is disclosed in Japanese Patent Unexamined Publication No. 7-174536, the disclosure of which is incorporated herein by reference.

Figure 12A:
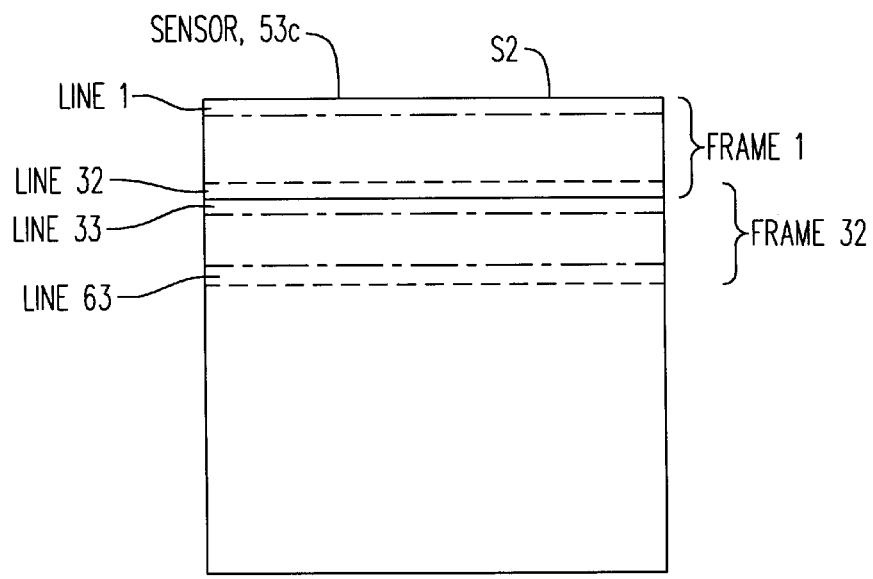
FIGS. 12a and 12b are diagrams showing the relationship between lines and frames on a sensor imaging surface.
Figure 12B:
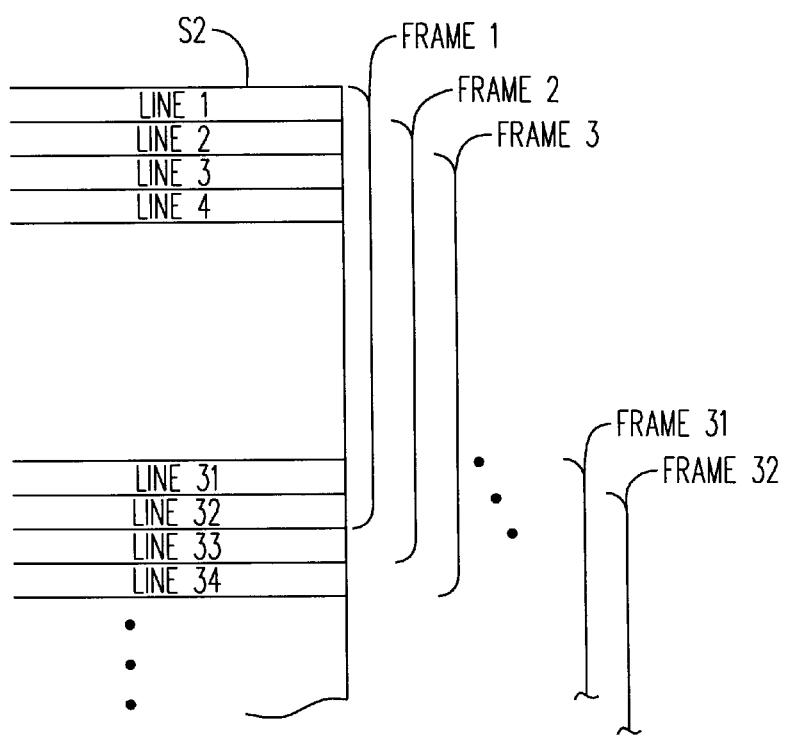
Figure 13:
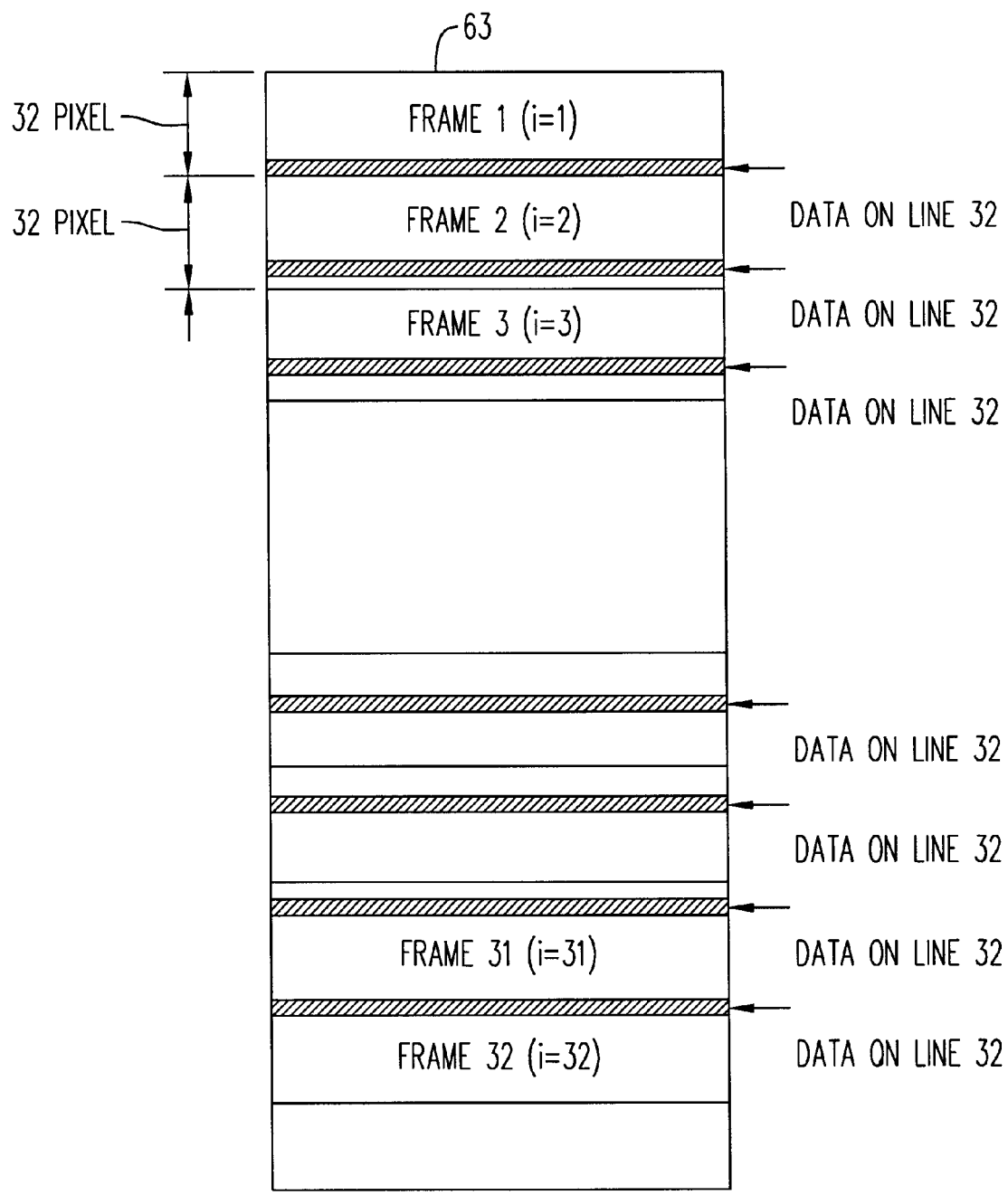
FIG. 13 is a diagram showing how incident light data for each frame is stored in a memory.
Figure 14:
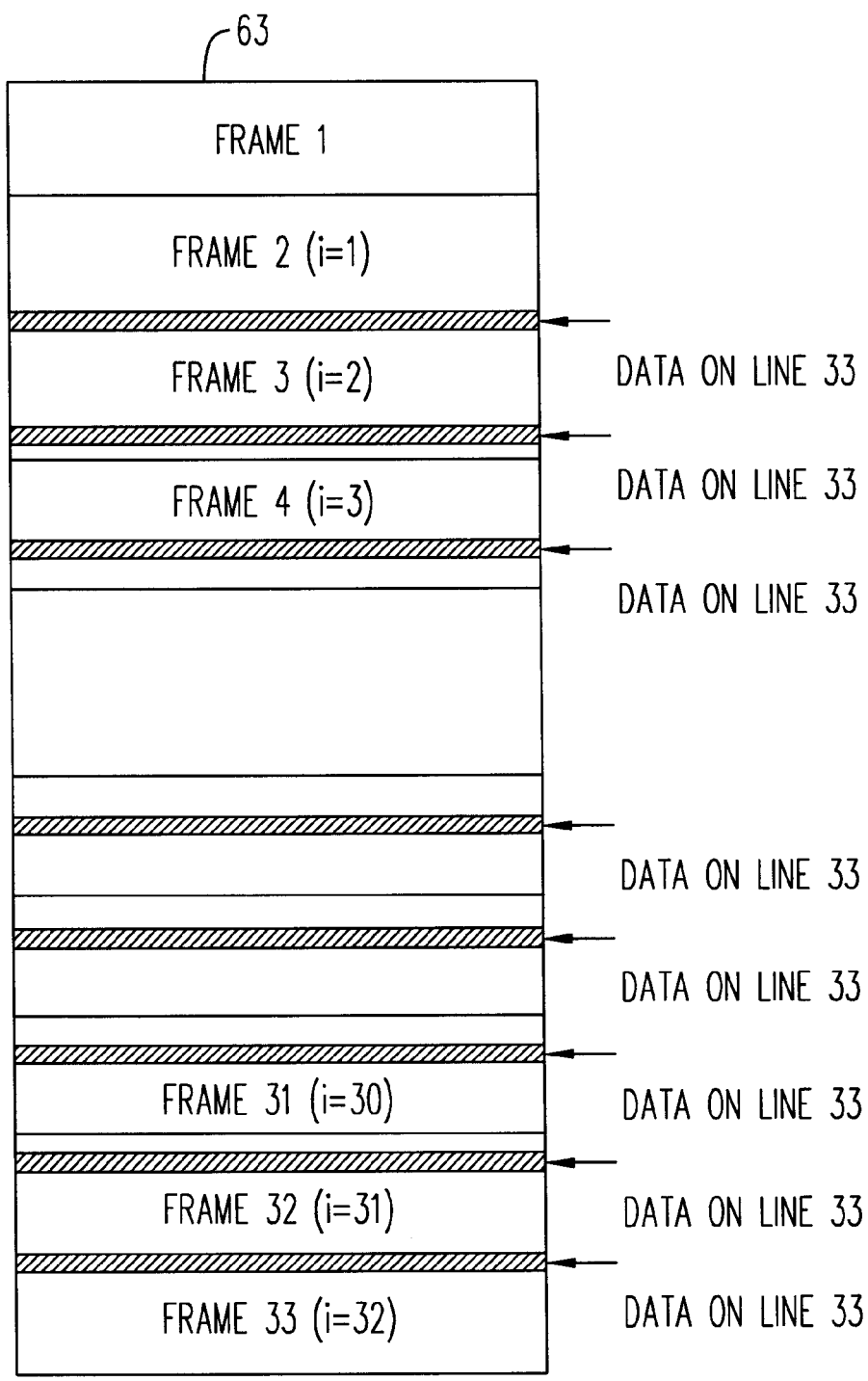
FIG. 14 is a diagram showing how incident light data for an additional frame is stored in the memory.
Figure 15:
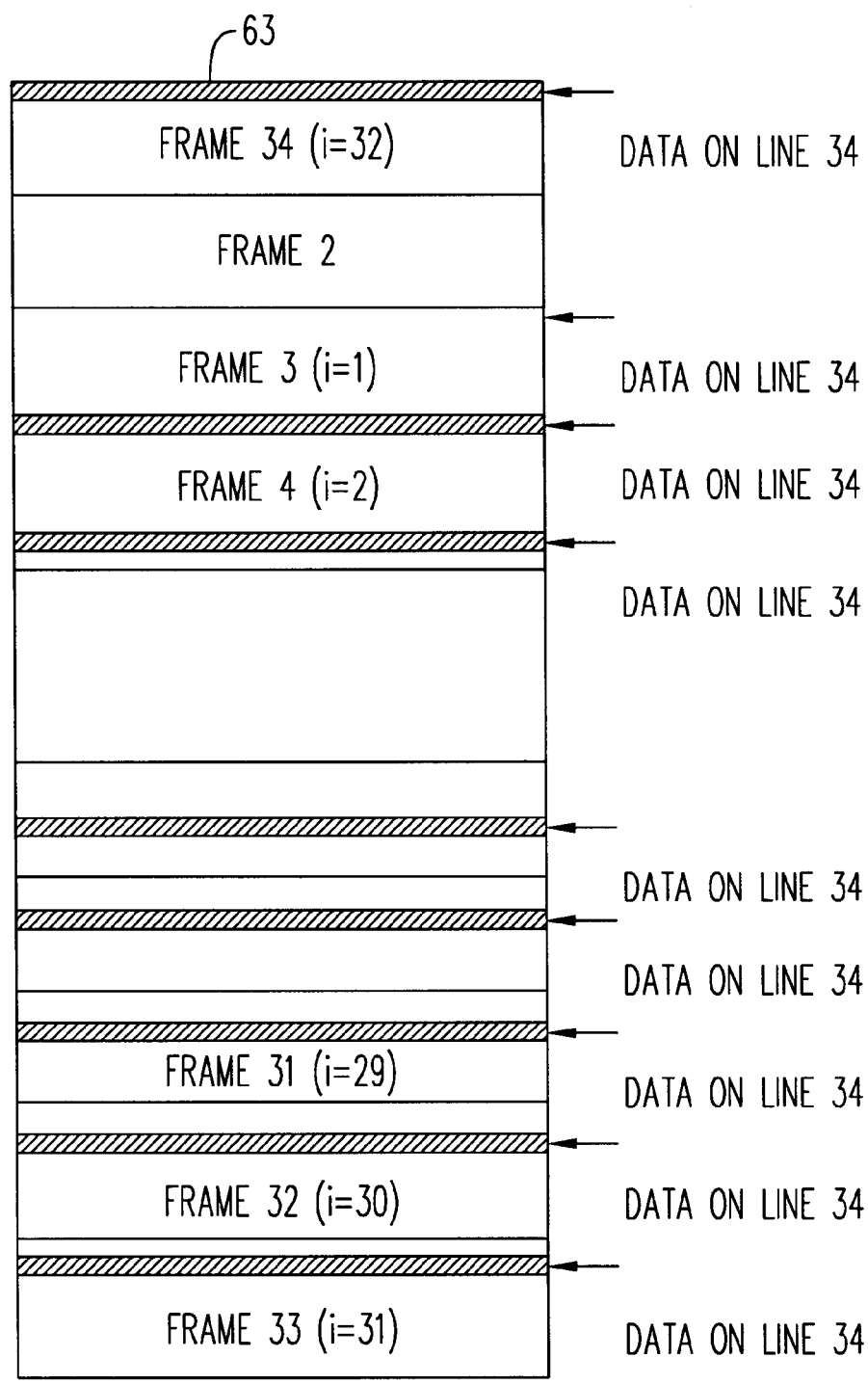
FIG. 15 is a diagram showing how incident light data for further additional frames is stored in the memory.

FIGS. 12a and 12b are diagrams showing the relationship between a line and a frame on the imaging surface S2 of the monochrome measuring sensor 53c, and FIGS. 13 to 15 are diagrams showing how the incident light data of the respective frames are stored in the memory 63.

As shown in FIGS. 12a and 12b, frame 1, which is the first frame on the imaging surface S2, contains incident light data for 32×200 pixels (from line 1 to line 32). Frame 2 is from line 2 to line 33, and frame 3 is from line 3 to line 34, the region thus being shifted by one line from one frame to the next. Frame 32 is from line 32 to line 63. There are 200 pixels per line, as noted above.

The incident light data for frame 1 to frame 32 is sequentially transferred to the memory 63 via the output processing circuit 62, and is stored in the memory 63, as shown in FIG. 13. More specifically, the memory 63 stores the incident light data for frame 1, frame 2, frame 3, . . . in this order. The data for line 32 contained in each frame is shifted upward by one line for each frame, that is, the 32nd line in frame 1, the 31st frame in frame 2, and so on. When the incident light data for frame 1 to frame 32 has been stored in the memory 63, the temporal centroid Npeak is calculated for each pixel on line 32.

While the calculations are being performed for line 32, the incident light data for frame 33 is transferred to the memory 63 for storage. As shown in FIG. 14, the incident light data for frame 33 is stored in the area next to the area of the frame 32 in the memory 63. When the data for frame 33 has been stored in the memory 63, the temporal centroid Npeak is calculated for each pixel on line 33 contained in frame 2 to frame 33.

While the calculations are being performed for line 33, the incident light data for frame 34 is transferred to the memory 63 for storage. As shown in FIG. 15, the incident light data for frame 34 is stored in the area where frame 1 was stored, and overwrites this previously stored data. Since the data of frame 1 has already been processed, the data can be safely erased by overwriting. When the data for frame 34 has been stored in the memory 63, the temporal centroid Npeak is calculated for each pixel on line 34. When the incident light data for frame 34 has been processed, the incident light data for frame 35 is stored in an overwriting fashion in the area where frame 2 was stored.

In this way, the temporal centroids Npeak are calculated for a total of 200 lines, up to line 231, which is the last line. Of the incident light data stored in the memory 63, the data rendered unnecessary is sequentially overwritten with new incident light data, as described above, thus serving to save the capacity of the memory 63.

Figure 16:
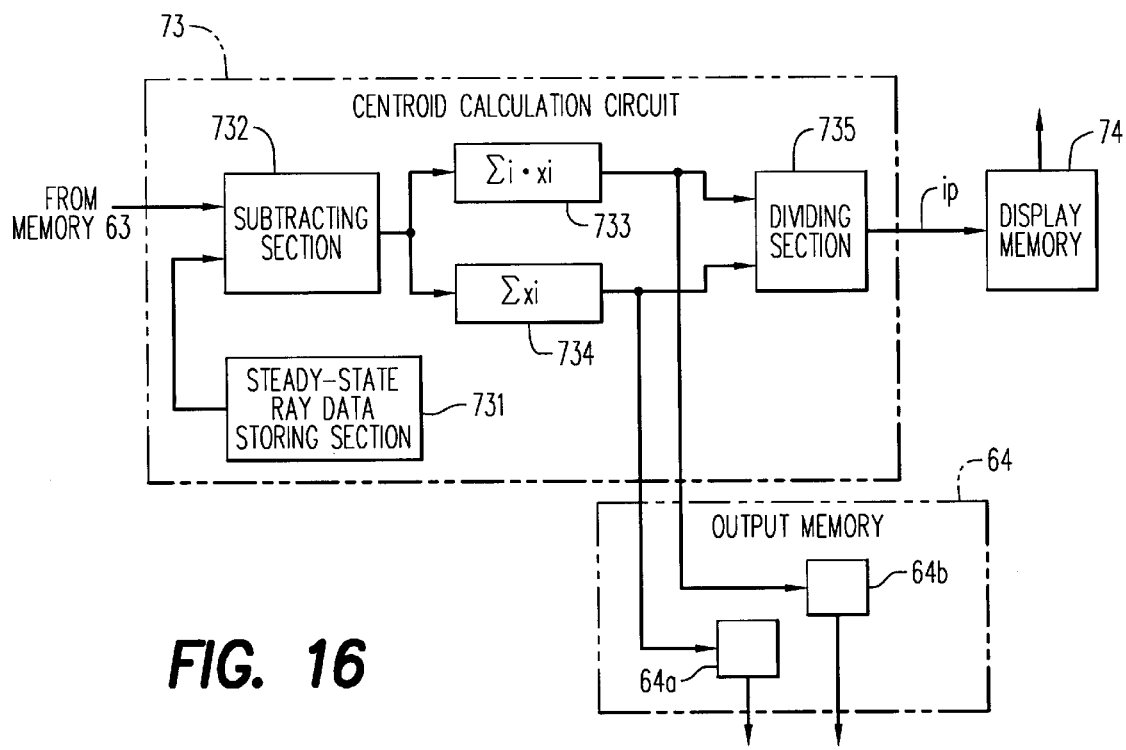
FIG. 16 is a block diagram showing the configuration of a centroid calculation circuit.
Figure 17:
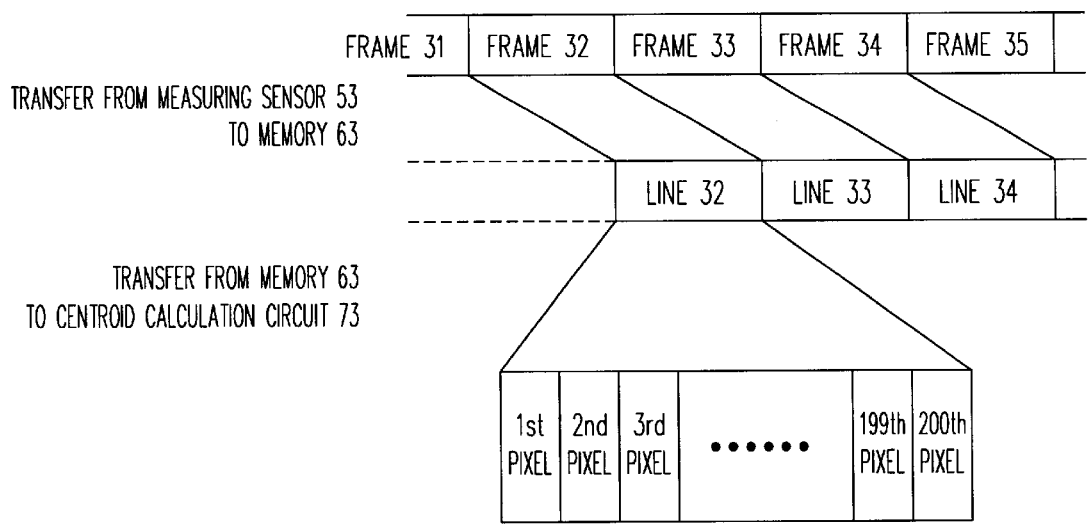
FIG. 17 is a diagram showing the concept of data transfer timing.

The configuration of the centroid calculation circuit 73 will now be described, along with the calculations of the temporal centroids Npeak performed by the centroid calculation circuit 73. FIG. 16 is a block diagram showing the configuration of the centroid calculation circuit 73, FIG. 17 is a diagram showing the concept of data transfer timing, and FIG. 18 is a diagram showing the concept of the temporal centroid Npeak.

Figure 18:
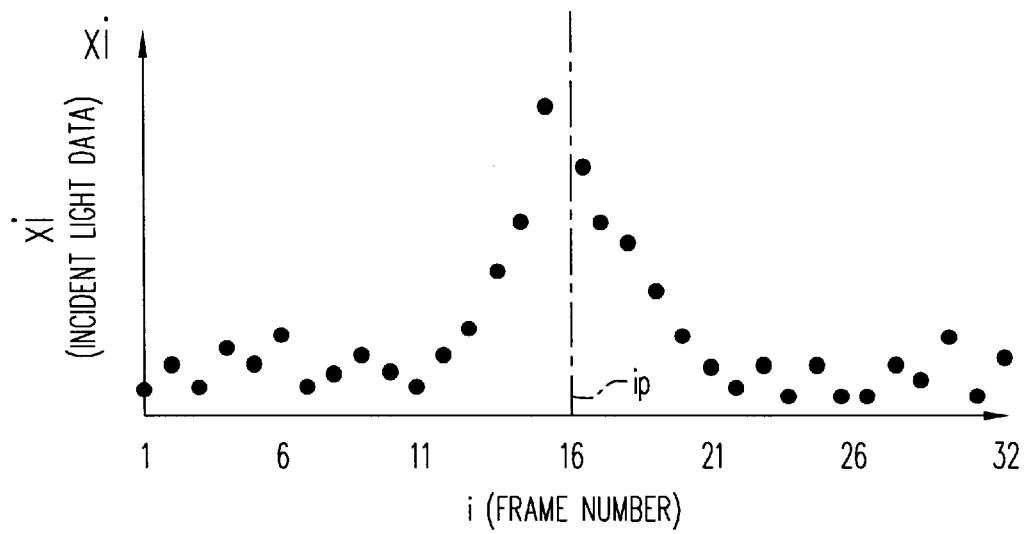
FIG. 18 is a diagram showing the concept of a temporal centroid.
Figure 19:
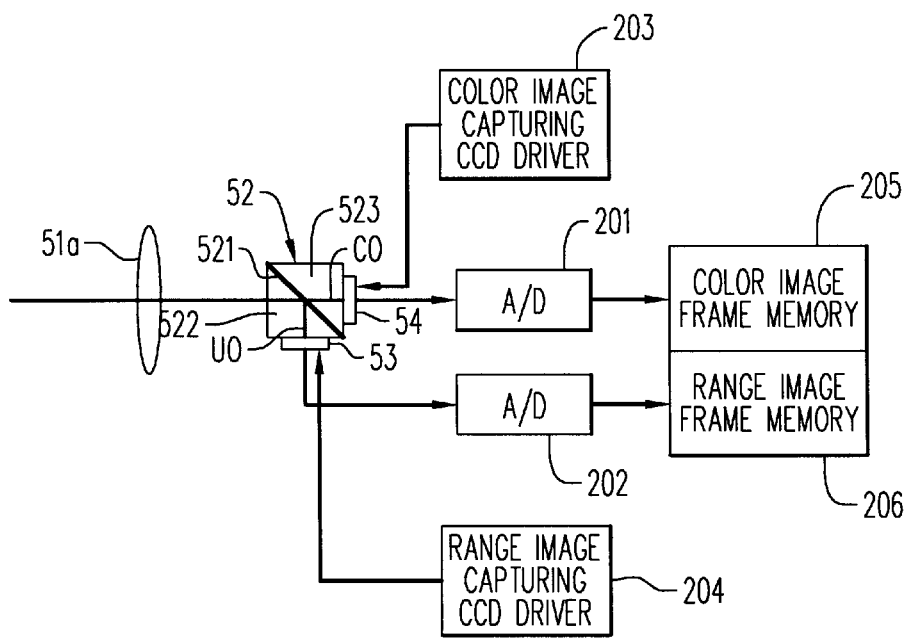
FIG. 19 is a diagram for explaining the configuration of an active type three-dimensional measurement apparatus according to the prior art.

As shown in FIG. 18, the temporal centroid Npeak is the centroid of the 32 pieces of incident light data obtained by the 32 samplings. Sampling numbers 1 to 32 are associated with the 32 items of incident light data for each pixel. The i-th sample of incident light data is represented by xi, where i is an integer between 1 and 32. At this time, the index i for a given pixel represents the number of frames processed after the pixel entered the effective light receiving region Ae.

The centroid ip of the 1st to 32nd incident light data x1 to x32 is obtained by dividing Si·xi, the summation of i·xi, by Sxi, the summation of xi. This is written as:

$$ip = \frac{\sum_{i=1}^{32} i * xi}{\sum_{i=1}^{32} xi}$$

The centroid calculation circuit 73 calculates the centroid ip (i.e., temporal centroid Npeak) of each pixel based on the data read out of the memory 63. However, the data read from the memory 63 is not used directly, but the value obtained by subtracting steady-state ray data ks from each data sample is used (if the value is negative, 0 is used). That is, by subtracting the steady-state ray data ks, an offset is given to the incident light data output from the measuring sensor 53c.

The steady-state ray data ks is the data calculated based on the incident light data of the pixel when the slit ray U is not incident on it. A predetermined fixed value may be used as the steady-state ray data ks, or alternatively, the data may be obtained in real time by using data output from the monochrome measuring sensor 53c. When using a fixed value, if the output of the monochrome measuring sensor 53c is 8 bits (256 gray scale levels), the value is set to "5", "6", or "10", for example. When obtaining the data in real time, the mean value of the incident light data for two pixels before and after the 32 samples of incident light data for a given pixel is obtained, and the data with the smaller mean value is taken as the steady-state ray data ks. The reason is that the slit ray U is not incident on an area either before or after the effective light receiving region Ae and, therefore, the incident light data when the slit ray U is not incident can be reliably obtained in real time. Further, of the incident light data for the two pixels before and after a given pixel, the data with the larger mean value may be taken as the steady-state ray data ks. Alternatively, the mean value of the incident light data of the two pixels before the 32 samples of incident light data, or the mean value of the incident light data of the two pixels after the 32 samples of incident light data, may be used. Incident light data for one pixel may also be used. Furthermore, depending on the shape of the object Q or the condition of the noise contained in the incident light data, a value obtained by adding a predetermined value (for example, 5) to the above values may be used as the steady-state ray data ks, thereby increasing the offset to ensure reliable elimination of unwanted noise components. In such cases, though the size of one frame is 36 lines, 34 lines, or 33 lines, it is only necessary to use 32 samples of data for 32 lines for the calculation of the centroid ip.

Referring back to FIG. 16, the centroid calculation circuit 73 consists of a steady-state ray data storing section 731, a subtracting section 732, a first summing section 733, a second summing section 734, and a dividing section 735. These sections are implemented using software, but it is also possible to construct all or part of them by hardware circuits.

The steady-state ray data storing section 731 stores the steady-state ray data ks. The subtracting section 732 subtracts the steady-state ray data ks from the input incident light data. The data output from the subtracting section 732 is denoted as incident light data xi. The first summing section 733 sums i·xi for i=1 to 32, and outputs the value of the sum. The second summing section 734 sums xi for i=1 to 32, and outputs the value of the sum. The dividing section 735 divides the output value of the first summing section 733 by the output value of the second summing section 734, and outputs the centroid ip. The centroid ip output from the dividing section 735 is stored in the display memory 74. The output value of the first summing section 733 and the output value of the second summing section 734 are stored in output memories 64a and 64b, respectively. The data stored in the output memories 64a and 64b are transmitted from the digital output terminal 33 to the host 3 via the SCSI controller 66 or stored on the recording medium 4. At the host 3, processing for three-dimensional position calculations is performed on the basis of this data, and also, the reliability of this data is judged.

Referring to FIG. 17, the memory control circuit 63A sequentially specifies addresses in the memory 63 for each pixel so that the centroid calculation circuit 73 performs the above described processing for the pixel. For example, for line 32, the first line to be processed, an address is specified first for the data of the first pixel on line 32 contained in frame 1, then for the data of the first pixel on line 32 contained in frame 2, and so on, thus specifying addresses sequentially for a total of 32 data samples from frame 1 to frame 32 for the first pixel on line 32. By thus specifying the addresses, data is read from the memory 63 and transferred to the centroid calculation circuit 73. While the calculations are being performed for line 32, the incident light data for the next frame 33 is transferred into the memory 63. For the subsequent frames also, reading and writing of the memory 63 are performed concurrently, thus achieving efficient circuit operation.

When the 32 samples of data have been input to the centroid calculation circuit 73, the dividing section 735 outputs the centroid ip. Next, processing is performed on the data of the second pixel, then on the data of the third pixel, and so on, until the 200th pixel is processed, thus completing the calculations of the centroids ip for line 32. Upon completion of the calculations of the centroids ip for line 32, the calculations of the centroids ip are performed for line 33, then for line 34, then for line 35, and so on, until all 200 lines up to line 231 are processed for the calculations of the centroids ip.

The centroids ip stored in the display memory 74 are displayed on the screen of the LCD 21. Each centroid ip is related to the position of a surface port ion of the object Q being measured, with the value of the centroid ip increasing as the distance from the position of the surface of the object Q to the three-dimensional camera 2 decreases, and decreasing as the distance increases. Therefore, the distance distribution can be presented by displaying a grayscale image using the centroids ip as grayscale data.

The configuration shown in FIGS. 9 to 18 is also employed in the first and second embodiments described in connection with FIGS. 3–4 and 5–6, respectively. If the displayed image is a color image in these embodiments, the grayscale values calculated from the centroids are used to control the intensity of the color displayed on each pixel.

In the present embodiment, a monochrome luminance image can be displayed on the display 3b by using Sxi. That is, Sxi is the sum of the outputs for the 32 frames. In one of the 32 frames, the slit ray reflected at the subject is received (assuming the subject is within the measurable range). Since most of the ambient light is cut off by the band pass filter 80g, Sxi represents the sum of the slit ray components irradiated during the 32 frame periods. The sum of the slit ray components can likewise be obtained for all pixels. When Sxi for each pixel is treated as the display luminance data of each pixel, the result is a monochrome image (a monochrome image for the wavelength of the slit ray).

If there are 13 bits available for the data range of Sxi, and 8-bit data is used to produce a monochrome luminance display, for example, then the remaining 8 bits in Sxi, after the three highest order bits and the two lowest order bits have been removed, might be used. The particular 8-bit data to be used should be determined by considering the actual values for Sxi.

The embodiments have been described for the case where a CCD is used as the imaging device, but it will be appreciated that the range image and the color image can also be captured if a CMOS imaging sensor or the like is used as the imaging device.

What is claimed is:

1. A three-dimensional measurement apparatus comprising:
    an optical system which projects a reference beam having a predetermined wavelength toward a target object to be measured;
    a light sensor which is sensitive to light in a range of wavelengths including said predetermined wavelength and other wavelengths, and which receives light from said target object and produces output data relating thereto;
    calculating means for calculating a three-dimensional shape of said target object based on first output data that is generated by said light sensor on the basis of received light including said predetermined wavelength; and
    generating means for generating two-dimensional image information for said target object based on second output data from said light sensor that is based on received light of wavelengths excluding said predetermined wavelength.

2. The three-dimensional measurement apparatus of claim 1, wherein said light sensor is a color measurement sensor.

3. The three-dimensional measurement apparatus of claim 2, further including a light filter including an infrared cutoff portion and a band pass portion, and a filter switching mechanism for selectively placing said cutoff portion or said band pass portion in an operative relationship with said light sensor in dependence upon whether the output data from said sensor is to be used by said display device or said calculating means, respectively.

4. The three-dimensional measurement apparatus of claim 1, wherein said light sensor is a monochromatic light sensor.

5. The three-dimensional measurement apparatus of claim 4, further including a light filter having a plurality of color filter portions and a band pass portion, and a filter switching mechanism for selectively placing said plurality of color filter portions or said band pass portion in an operative relationship with said light sensor in dependence upon whether the output data from said sensor is to be used by said display device or said calculating means, respectively.

6. The three-dimensional measurement apparatus of claim 1, wherein said optical system includes a scanning device which scans the reference beam across the target object, and said light sensor produces multiple data samples of each pixel of an image as said reference beam is being scanned, and further including a centroid calculation circuit which calculates the centroid for each pixel on the basis of said multiple data samples, wherein said display device displays said image as a grayscale image based on said centroids.

7. The three-dimensional measurement apparatus of claim 6, wherein each data sample from said light sensor comprises a frame containing a predetermined number of lines of an image, and said centroid calculation circuit calculates the centroid for each pixel on a line once said predetermined number of frames have been sampled.

8. The three-dimensional measurement apparatus of claim 7, wherein the centroid for each pixel on a line is calculated while the data for the next frame following said predetermined number of frames is being sampled and stored in a memory.

9. A method for determining the three-dimensional shape of an object and displaying an image of the object, comprising the steps of:
   projecting a reference beam having a predetermined wavelength toward an object to be measured;
   receiving light from the object by means of a light sensor which is sensitive to light in a range of wavelengths including said predetermined wavelength and other wavelengths;
   generating output data from said light sensor indicative of the amount of light received from the object;
   calculating information relating to the three-dimensional shape of the object on the basis of first output data from said light sensor that is based on received light including said predetermined wavelength; and
   generating two-dimensional image information for said target object based on second output data from said light sensor that is based on received light of wavelengths excluding said predetermined wavelength.

10. The method of claim 9, further including the steps of selectively filtering light received by said light sensor with an infrared cutoff filter or a band-pass filter in dependence upon whether the data generated by said light sensor is to be used to display said image or to calculate said three-dimensional shape, respectively.

11. The method of claim 9, further including the steps of selectively filtering light received by said light sensor with a plurality of color filters or with a band-pass filter in dependence upon whether the data generated by said light sensor is to be used to display said image or to calculate said three-dimensional shape, respectively.

12. The method of claim 9, further including the steps of scanning said reference beam across said object, generating multiple data samples of each pixel of an image as said reference beam is being scanned, calculating a centroid for each pixel on the basis of said multiple data samples, and displaying said image as a grayscale image based on said centroids.

13. The method of claim 12, wherein said light sensor produces successive data samples each comprising a frame containing a predetermined number of lines of an image, and the centroid for a pixel on a line is calculated once said predetermined number of frames have been sampled.

14. The method of claim 13, wherein the centroid for each pixel on a line is calculated while the data for the next frame following said predetermined number of frames is being sampled and stored in a memory.

15. A three-dimensional measurement apparatus comprising:
   a scanning light projection system;
   a single light sensor which receives light reflected from a target object;
   a processor which determines a three-dimensional shape of said target object based on output data from said light sensor in a first operation mode;
   a display device which displays an image of said target object on the basis of output data from said sensor in a second operation mode; and
   at least one optical filter which is selectively disposed in an optical path of said light sensor in dependence upon the operation mode.

16. The three-dimensional measurement apparatus of claim 15, wherein said light sensor is a color measurement sensor.

17. The three-dimensional measurement apparatus of claim 15, wherein said light sensor is a monochromatic light sensor.

18. A three-dimensional information measurement apparatus comprising:
   an optical system for projecting a reference beam toward a target object to be measured;
   a light sensor for receiving light reflected from said target object; and
   a controller for producing first and second sets of information, said first set of information being related to a three-dimensional shape based on an output of said sensor while said optical system projects the reference beam toward the target, and said second set of information being related to a two-dimensional shape based on output of said sensor during a period of time that said optical system does not project the reference beam.

19. The three-dimensional measurement apparatus of claim 18, wherein said controller controls said optical system and said light sensor to produce said first and second sets of information at different times.

20. The three-dimensional measurement apparatus of claim 18, wherein said controller positions a filter in front of the light sensor in a light path when at least either said first set of information is produced or said second set of information is produced.

21. The three-dimensional measurement apparatus of claim 20, wherein said controller positions the filter in front of said light sensor when the first set of information is produced, and said filter is capable of transmitting only light which has same wavelength as said reference beam.

* * * * *